United States Patent [19]
Voggenthaler

[11] 3,912,395
[45] Oct. 14, 1975

[54] OPTICAL SYSTEM CALIBRATION METHOD
[75] Inventor: John A. Voggenthaler, Sunnyvale, Calif.
[73] Assignee: Itek Corporation, Lexington, Mass.
[22] Filed: Apr. 6, 1970
[21] Appl. No.: 25,813

[52] U.S. Cl................................. 356/124; 356/125
[51] Int. Cl. ............................................. G01b 9/00
[58] Field of Search.................... 356/124, 126, 109; 350/162

[56] References Cited
UNITED STATES PATENTS
| | | | |
|---|---|---|---|
| 1,532,879 | 4/1925 | Bugbee | 356/125 |
| 1,590,532 | 6/1926 | Lenouvel | 356/124 |
| 3,045,531 | 7/1962 | Prescott | 350/162 |
| 3,512,871 | 5/1970 | Zweig | 350/162 |

Primary Examiner—Ronald J. Stern
Assistant Examiner—Conrad Clark
Attorney, Agent, or Firm—Homer O. Blair; Robert L. Nathans; Gerald H. Glanzman

[57] ABSTRACT

A method for the calibration of distortion in optical systems. A beam of collimated light is diffracted into various orders by being passed through a diffraction grating. The diffracted light emerging from the grating is then refocused by the optical system being calibrated resulting in an array of images in the focal plane of the optical system. The relationship between the actual positions of the images in the array and the calculated positions for a distortion-free system provides a measure of the distortion present in the system.

8 Claims, 3 Drawing Figures

U.S. Patent   Oct. 14, 1975   3,912,395
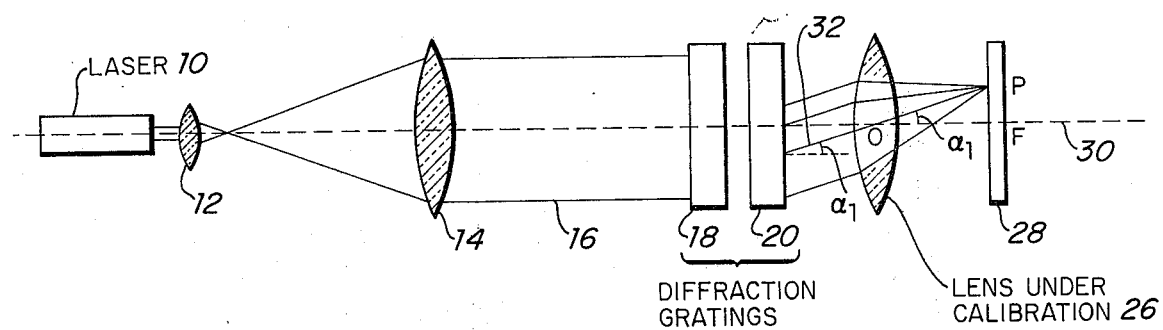
FIG. 1.
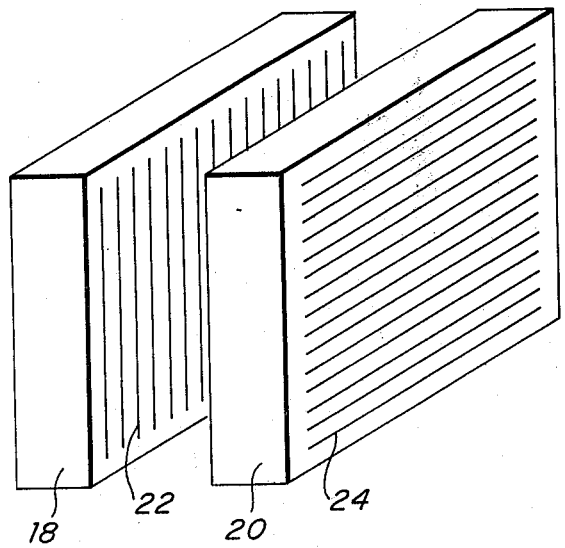
FIG. 3.
FIG. 2.
JOHN A. VOGGENTHALER
INVENTOR.
BY Gerald H. Glanzman
ATTORNEY.

OPTICAL SYSTEM CALIBRATION METHOD

BACKGROUND OF THE INVENTION

1. Field of the Invention

The present invention relates to a method for calibrating the distortion in an optical system. More particularly, the invention relates to a method for calibrating the distortion of lens systems such as employed in aerial mapping cameras and navigational systems.

2. Description of the Prior Art

In many photographic applications it is necessary to ascertain whether the relative locations of objects in a scene are being accurately represented in the reproduction. This is of particular importance in navigational and aerial mapping applications wherein a large area is covered in a single photograph taken from a distant location. In such a situation, any distortion present in the lens system of a camera, for example, will greatly affect the accuracy of the photographic reproduction. To be entirely free of distortion, a system must have uniform lateral magnification over its entire field. When distortion is present, differences in magnification will cause the images of points in the scene being photographed to be displaced relative to one another. The degree of displacement furthermore may vary in different areas of the image field.

In view of these errors which may be introduced into a photographic reproduction due to distortion, it has become the practice to calibrate the lens system in order that the distances or positions represented in the photographic image may be corrected by compensating for the distortion. One traditional method for doing this has been to photograph, through a lens system, a plurality of surveyed targets in an open field. Since the actual location of each of the targets is precisely known, any variation between their known positions and the positions shown in the photographic image can be attributed to the lens distortion. The amount of deviation in any given portion of the image field may be easily determined and this information can then be utilized to correct past or future photographs taken through the same lens system. This method, however, suffers from the disadvantage that it is time consuming and expensive since a large number of survey points covering a wide image field is desired, thus requiring a large number of precise measurements.

A second method often employed is to photograph the night sky and utilize the stars as the image points. Since the precise location of the stars is known, they can be used to provide an accurate indication of the distortion. This method offers the attraction of providing a very large number of survey points obtainable in one exposure. However, it suffers from such handicaps as vagaries of the weather and the phase of the moon (which creates unfavorable lighting conditions). Furthermore, the distortion of cameras designed for pointing earthward can be significantly different when pointed toward the sky.

Because of all these above-mentioned disadvantages, a very popular calibration method presently employed involves the creation of an artificial star field in the laboratory. This is done by providing a large number of precisely positioned artificial light sources. In general, this method consists of providing a large array of collimators aligned at different angles to be directed through the lens system under calibration. By carefully aligning each of the collimators, it can be easily calculated where, in the focal plane of the lens system, the images from each should be located after passing through the lens system. Any variations from these calculated positions will indicate the distortion in the system.

This system, although solving many of the above-mentioned problems, is still not completely satisfactory. For one thing, it is extremely expensive and complex requiring perhaps one hundred or more separate collimators in order to achieve sufficient accuracy. Furthermore, each collimator must be carefully aligned and continuously monitored to ensure the alignment is maintained.

In accordance with the present invention, therefore, it is desirable to provide a calibration method in which the disadvantages inherent in all the above-mentioned methods are avoided. In particular, it is desirable that a calibration method be designed that is inexpensive, highly accurate, quick and easy to perform and not dependent on the vagaries of weather or other natural events. More specifically, it is desirable to provide a calibration method performable in the laboratory that does not require a large number of separate, carefully aligned collimators, that requires only limited space, and that still provides a large number of image points with which a highly accurate calibration can be made.

SUMMARY OF THE INVENTION

In accordance with a preferred embodiment of this invention, the above and other desired goals are attained by generating an artificial star field through the agency of a diffraction grating. A single beam of collimated light is directed through the diffraction grating resulting in a plurality of diffracted wavefronts emerging from the grating. The lens system being calibrated is positioned in the path of these diffracted wavefronts and focuses the light in the focal plane of the lens system. The resultant diffraction pattern will be in the form of an array of image areas or points, which image areas may be precisely located in accordance with basic grating equations. Any variation between the calculated positions of these areas and the actual positions will represent the distortion in the lens system.

By employing a crossed diffraction grating or grid in the practice of this method, (in accordance with a preferred embodiment), a large number of points in a generally square array may be provided. This will permit accurate calibration to be carried out over a large field. Since only one collimator is needed in this method rather than a large number as in the prior art, the system is much easier to build and accurate alignment is much easier to maintain. Furthermore, the method is relatively inexpensive to perform and requires only limited space.

The method readily lends itself to diverse applications. For example, it can readily be employed to calibrate distortion at several different wavelengths of radiation in one exposure. Additionally, it could be utilized for the in-process testing of a camera before and after the camera undergoes thermal, vibrational, or other environmental tests. In general, it provides a unique method for determining the distortion of a large variety of optical instruments.

The above and other features of this invention will be more readily understood by referring to the following detailed description of a preferred embodiment taken in conjunction with the accompanying drawings.

BRIEF DESCRIPTION OF THE DRAWINGS

FIG. 1 shows in schematic form a preferred system which may be employed in practicing the present method.

FIG. 2 is an enlarged plan view of the crossed diffraction gratings employed in the system of FIG. 1.

FIG. 3 shows the resultant image array generated in the film plane of FIG. 1.

DESCRIPTION OF THE PREFERRED EMBODIMENT

FIG. 1 illustrates a preferred system with which a lens may be calibrated in accordance with the present method. The system comprises a light source 10 which is preferably a laser because of its high intrinsic brightness although this is not essential. Generally, any monochromatic source would be satisfactory. As shown in FIG. 1, the light beam from the laser is directed through a diverger lens 12 and a collimator lens 14 in order to provide a generally wide beam of collimated light (identified in the Figure by the reference number 16). This collimated beam of light is then passed through a pair of diffraction gratings 18 and 20 which diffract the light into various angles or orders. These gratings are shown more clearly in FIG. 2 and consist of two separate, parallel linear gratings 18 and 20 having their openings on lines 22 and 24, respectively, oriented at 90° to one another for effectively providing a crossed diffraction grating or grid. Alternatively, the grating lines may be both provided on a single substrate if so desired.

Reference is made to FIG. 7 of U.S. Pat. No. 3,045,531 to Prescott wherein the structure so far described is employed for the purpose of making a grating which produces diffraction spectra of zero and first orders while producing substantially no spectra of higher orders. This reference contains a general description of how a grating operates and its effect on light passing through it and may be consulted for this purpose.

As is well-known in the art, if collimated light is incident to a grating, a set of secondary wavelets is generated upon emergence of the light from the grating openings. As some angular direction from the original wave propogation direction there will occur the condition where the light from one opening will be exactly one wavelength out of phase from the light from an adjacent opening. When this condition occurs, constructive interference takes place when the light is imaged in the focal plane of a lens positioned in the path of these emerging wavefronts. If the grating is a crossed diffraction grating or grid, the resultant diffraction pattern imaged in the focal plane will be in the form of a large number of images or points arranged in a more-or-less square matrix. The locations of these images is a function of the grating spacing, the wavelength of the incoming light, and the angle of incidence of the light with respect to the grating, and may be precisely calculated from the general grating equations for a crossed grating:

$M_x \lambda = a (\cos \alpha - \cos \alpha_o)$
$M_y \lambda = a (\cos \beta - \cos \beta_o)$ where:

$a$ = grid spacing $\alpha_o$ and $\beta_o$ = the angle of incidence of the incoming light with respect to the $x$ and $y$ axes, respectively, of the grating $\alpha$ and $\beta$ = the angle of diffraction with respect to $x$ and $y$ axes, respectively $\lambda$ = the wave length of the incoming light and $M_x$ and $M_y$ = 0, 1, 2, 3 . . . , the various orders of the diffracted light.

If the incoming light impinges on the grating perpendicular to the face of the grating then:

$\cos \alpha_o$ and $\cos \beta_o = 0$ and the equations will reduce to:

$M_x \lambda = a \cos \alpha$
$M_y \lambda = a \cos \beta$

Since $\lambda$ and $a$ are predetermined and known constants for the system the angles $\alpha$ and $\beta$ can easily be calculated for the various orders and from these angles the precise locations of each image may be determined. This may be more clearly understood by returning to FIG. 1. As shown in this Figure, the lens 26 to be calibrated is positioned in the path of the diffracted light emerging from the gratings 18 and 20. This light is focused by the lens and forms an image or diffraction pattern in the focal plane of the lens. In practice, the lens 26 will constitute the lens of a camera having its film plane 28 positioned in the focal plane of the lens for recording the resultant diffraction pattern. In FIG. 1, the formation of a single image P corresponding to a particular order $M_1$ is graphically shown. From the above grating equations, the angle $\alpha_1$ may be readily calculated. As can be seen in the drawing, there will be a principal ray 32 which will pass undeviated through the center 0 of the lens. Therefore, by knowing the focal length OF of the lens and angle $\alpha_1$ the distance FP and hence, the position of P can be easily determined. It should be understood that point P may also have a component in the plane perpendicular to the plane of the drawing in which case the angle $\beta_1$ may be found in a similar manner. Thus it is clear that the location of each and every image area generated on the film plane 28 may be easily calculated.

In FIG. 3, the array of image areas or orders as they would appear on the film plane 28 is shown schematically. Each image area corresponds to a different order of diffracted light (i.e. a different value of $M_x$ and $M_y$, respectively, as shown in the Figure). Since the precise location of where each of these images should appear after passing through the lens can be readily calculated, a method for generating an entire artificial star field has thus been provided which requires only a single source of collimated light and which can be photographed in a single exposure. If the lens is free from distortion, the actual position of each image will exactly correspond with its calculated position. If distortion is present in the lens, the locations of one or more of these images will be displaced by amounts representative of the distortion. If then, a scene is photographed through the same lens, any object located in the scene will be displaced in the resultant photograph by an amount equal to the displacement of the particular image in the artificial star field which is located in the same area of the image field as the object. Thus the artificial star field enables the lens to be calibrated to correct the position of any object in the photographed scene and thus compensate for the distortion.

In summary, it can be seen that the present method enables an entire artificial star field to be generated in the laboratory in a manner much simpler and quicker than previously possible. Initially, only a single source of light is needed as compared to the large number of separate collimators required in previous methods. This greatly reduces the cost of the system. Additionally it is much easier to align the system and ensure that it is maintained in alignment. In the multi-collimator method, each collimator must be separately aligned and monitored. In the present system a typical alignment procedure would be to point an autocollimating alignment telescope at the image from the collimator in order to establish a line of sight, and then, by autocollimation, the gratings may be squared onto the line of sight. In cameras where it is feasible to put a mirror in the focal plane frame, the focal plane can be squared onto the axis of the system establishing the principle point of autocollimation. In cameras where this cannot be done, a point of symmetry must be calculated from the data reduction.

The present method also enables highly accurate calibrations to be made. In the multi-collimator method, extreme accuracy requires a large number of light sources such that a sufficient number of image points may be provided in the artificial star field. In the present method, a sufficient number of image points may be provided merely by selection of the proper grating and wavelength of the incoming light. For example, if 2-inch square gratings, each having a grating frequency of 125 lines/mm are provided with incoming light having a wavelength $\lambda = 0.6328\ \mu$, a matrix of some 256 data points may be obtained having an angular coverage of 39°15minutes (half angle). Larger sized gratings could also be used to cover an even wider range of current mapping camera apertures.

It would also be possible to practice the method with a single linear grating. However, this would require rotating either the grating or the camera through a series of discrete angles. This would have the disadvantage of being time consuming and also may introduce errors. Gratings of circular or other shape might also be used in certain applications.

The light source, as previously indicated, could be almost any monochromatic source. A small helium-neon laser has been used with good results in the method. It would also be possible to employ a gas laser with krypton or argon which emits several wavelengths. This would permit a measure of distortion as a function of wavelength which can be done in one exposure.

While there has been described and illustrated a preferred embodiment of the present invention, it is apparent that numerous alterations, omissions, and additions may be made without departing from the spirit thereof. Accordingly, the invention should be limited only as required by the scope of the following claims.

I claim:

1. A method for calibrating the distortion of a lens system comprising:
   a. providing a collimated beam of light;
   b. passing said collimated beam of light through a diffraction grating for providing a plurality of diffracted wave fronts emerging from said grating;
   c. positioning the lens system to be calibrated in the path of said diffracted wave fronts emerging from said grating for focusing a plurality of images on an image receiving surface;
   d. locating the correct positions of said plurality of images for an undistorted lens system;
   e. locating the actual positions of said plurality of images on said image receiving surface; and
   f. comparing the differences between said actual and correct positions for said plurality of images, said differences representing the distortion present in said lens system.

2. A method for calibrating the distortion of a lens system as recited in claim 1 wherein a substantially monochromatic beam of light is passed through said diffraction grating.

3. A method for calibrating the distortion of a lens system as recited in claim 1 wherein said collimated beam of light is passed through said diffraction grating perpendicular to the plane of said diffraction grating.

4. A method for calibrating the distortion of a lens system as recited in claim 1 wherein said diffraction grating is a two-dimensional grating having two sets of parallel, equally-spaced lines oriented at 90° to one another, said plurality of images being an array of points arranged in a generally square matrix.

5. A method for calibrating the distortion of a lens system as recited in claim 1 wherein a camera containing the lens system to be calibrated is positioned in the path of said diffraction wave fronts emerging from said grating and wherein said plurality of images are focused on the film plane of said camera.

6. A method for calibrating the distortion of a lens system as recited in claim 1 wherein said collimated beam of light is provided by a helium-neon laser.

7. A method for calibrating the distortion of a lens system as recited in claim 1 wherein a collimated beam of light comprising several wavelengths is passed through said grating for providing a measure of distortion as a function of wavelength.

8. A method for calibrating the distortion of a lens system as recited in claim 1 wherein said image receiving surface is positioned at the focal plane of said lens system to be calibrated.

* * * * *